INVENTOR.
Delbert D. DeRees &
BY  Robert M. Fox
George E. Johnson
ATTORNEY

Feb. 23, 1965   D. D. DE REES ETAL   3,170,509
AUTOMOTIVE HEATING AND AIR CONDITIONING SYSTEMS
Filed Sept. 20, 1961   4 Sheets-Sheet 4

INVENTOR.
Delbert D. DeRees &
BY   Robert M. Fox
George E. Johnson
ATTORNEY

United States Patent Office 3,170,509
Patented Feb. 23, 1965

3,170,509
AUTOMOTIVE HEATING AND AIR
CONDITIONING SYSTEMS
Delbert D. De Rees, Rochester, and Robert M. Fox,
Detroit, Mich., assignors to General Motors Corporation, Detroit, Mich., a corporation of Delaware
Filed Sept. 20, 1961, Ser. No. 139,417
3 Claims. (Cl. 165—42)

This invention relates to heating and air conditioning and more particularly to systems for heating and/or cooling as well as ventilating passenger compartments of automotive vehicles.

In the automotive field a need has arisen for efficient heating systems or air conditioning systems or a combination of both which will be compact and at the same time will possess substantial portions which could be incorporated into the car body structure not only in the interest of simplicity and low cost but also to contribute rather than detract body rigidity.

An object of the present invention is to provide an efficient operative heating and/or air conditioning system of compact form having substantial portions which not only serve their intended functions for the system concerned but also strengthen the car body as stiffening elements. Another object is to provide a system in which components of either air conditioning or heating systems or both are employed in a car body without losing potential body rigidity acquired in manufacture of the body prior to complete car assembly. Another object is to provide a heating system to which conditioned air may be conducted and by which a portion of that air may be heated to determine the ultimate temperateure of air discharged into a passenger compartment for heating or cooling the latter.

A feature of the present invention is a casing manifold and multiple partition sub-assembly which is joined to the fire wall and cowl structure of an automotive vehicle as a permanent part thereof and subsequently capable of receiving and cooperating with one or more heat exchanger cores to control the temperature and extent of air flow into the passenger compartment of the vehicle. Another feature is a casing manifold sub-assembly having partitions lying in intersecting planes and having ports controlled by dampers for guiding air to a vehicle passenger compartment.

These and other important features of the invention will now be described in detail in the specification and then pointed out more particularly in the appended claims.

Automobile bodies are generally made of sheet metal including a fire wall located forwardly of the windshiled and separating the engine and passenger compartments. This fire wall in combination with the cowl metal work lends considerable structural strength and rigidity to the body but this potential strength or rigidity is often lost to a considerable extent by openings cut in the fire wall for the reception of mechanical elements to accommodate the flow of air for ventilating, heating and air conditioning. It is often possible somewhat to restore some of this lost strength or body rigidity by subsequently welding or bolting on casings or added plates wholly or partially to cover the required openings. By employing such an expedient, however, the integrity and strength of the body structure has heretofore not been restored to the extent desired as such casings and plates have not been resistant to torsion or twisting action and they have therefore not supplied sufficient reinforcement to the body structure. It is herein contemplated, in the carrying out of the present invention, that the opening or openings considered essential in the fire wall be made not only for the passage of air but made sufficiently large that heat exchange apparatus may be introduced through the fire wall into a closure sub-assembly forming a part of the body. In order to make this sub-assembly such as to contribute rigidity to the body, it is provided with partitions lying in planes which intersect and preferably extend in a direction parallel with the fire wall. The partitions thus provided give rigidity to the sub-assembly and when the latter is firmly affixed to the vehicle fire wall and cowl, the body exhibits most, if not all, of its potential rigidity.

Figure 1:
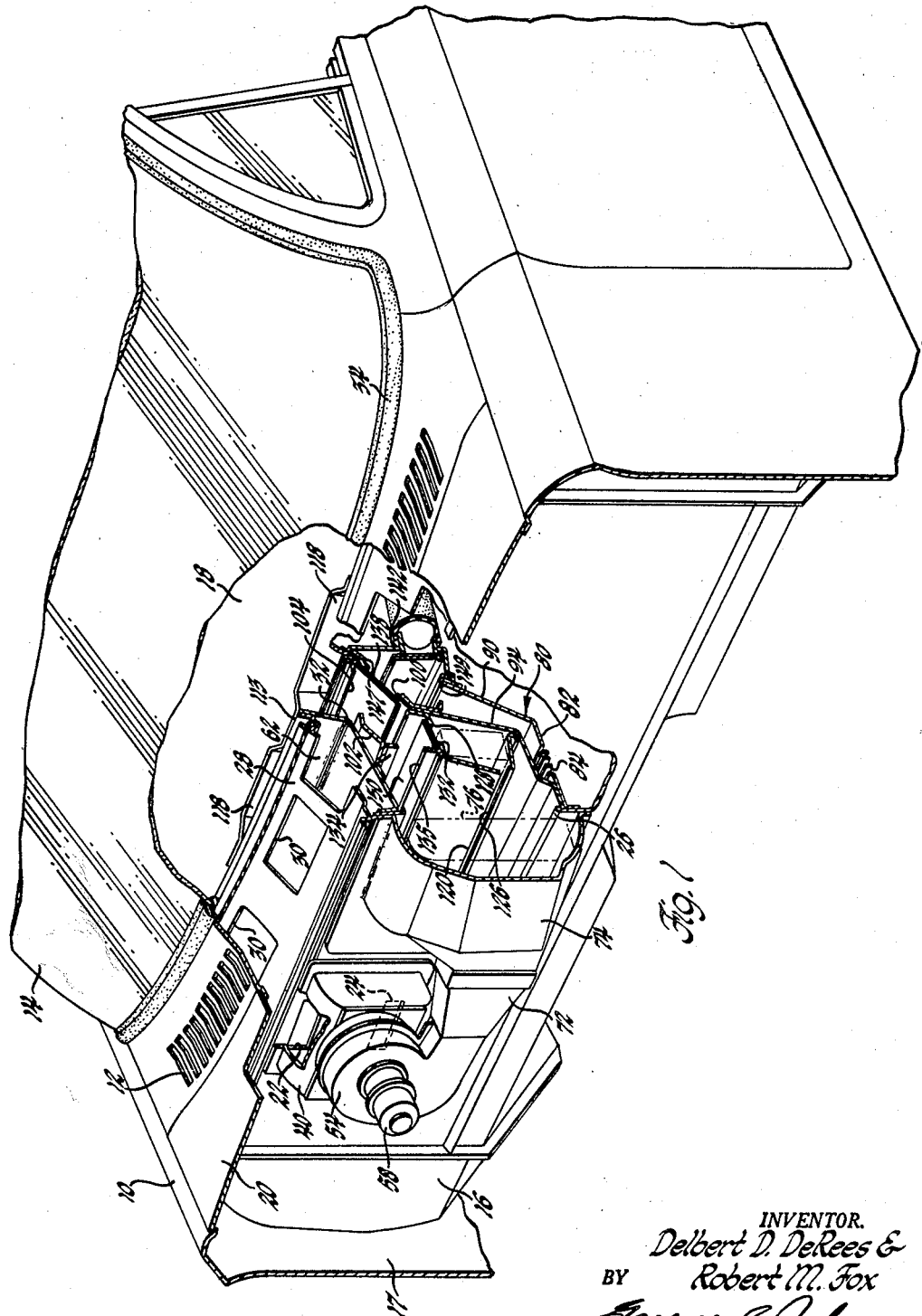
FIGURE 1 is a prespective view of the front portion of a vehicle body, portions being broken away better to illustrate the installation of a system which constitutes one embodiment of the present invention.

In FIGURE 1, an automobile body cowl structure is shown at 10. The top of the cowl structure is provided with a series of openings 12 for the reception of outside air and this series of openings is located immediately in front of a windshield 14. A fire wall 16 is arranged to separate the engine compartment 17 from the passenger compartment 18. A hood 20 is provided for enclosing the engine compartment.

Figure 5:
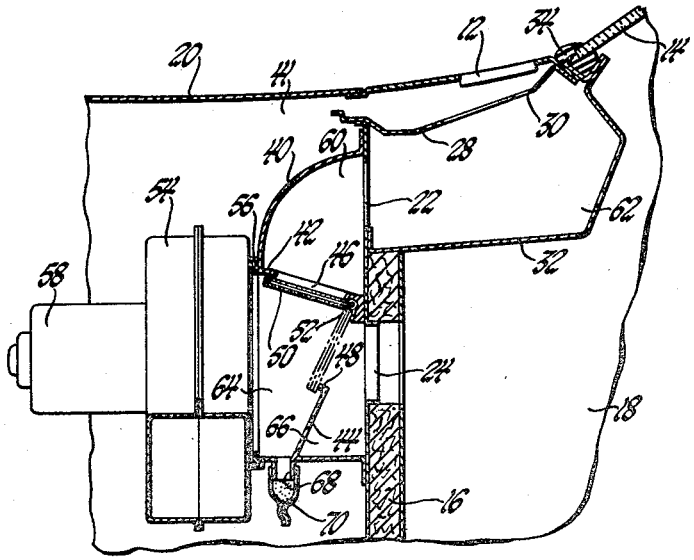
FIGURE 5 is a sectional view looking in the direction of the arrows 5—5 in FIGURE 4.

The fire wall 16 is of composite construction and it is provided with three openings. One of these openings is most clearly shown at 22 in FIGURES 2 and 5. Beneath the opening 22 is a recirculation air opening 24. At the center of the vehicle and in front of and below the openings 12 is located the third opening 26 which is a rather large opening and ordinarily would greatly weaken the body structure if the present invention were not employed. The cowl structure not only includes the outside sheet metal in which the openings 12 are located but also includes an inner panel 28 extending across the car body beneath the openings 12. This panel bears several large openings 30 best seen in FIGURE 1. Beneath and also to the rear of the panel 28 is another panel 32 which extends across the vehicle and connects the fire wall 16 with a windshield sealing arrangement 34. This panel 32 cooperates with the exterior body metal of the cowl to form a chamber 62 across the car and down both sides of the body. A somewhat similar chamber is illustrated in the United States Patent No. 2,852,997, granted September 23, 1958, in the names of J. D. Leslie, R. M. Fox and E. J. Premo.

On the right-hand portion of the fire wall 16 and registering with the openings 22 and 24 is a casing 40 which is fixed to the fire wall to extend into the engine compartment 41. This casing has two partitions 42 and 44 (FIGURE 5) which provide ports 46 and 48 respectively. It will be understood that air flow through the casing 40 may be controlled by a damper 50 pivoted at 52 and operated by a Bowden wire 53 leading to the instrument dash panel. The front of the casing 40 is apertured and communicates with the inlet side of a blower 54. A washer 56 is inserted between the blower casing and the casing 40 and the blower is served by a conventional motor 58. An upper portion of the casing 40 determines a chamber 60 which communicates with the cowl chamber 62 by means of the opening 22. The bottom half of the casing 40 has two chambers 64 and 66 separated by the partition 44 and adapted effectively to communicate with the passenger compartment by way of the fire wall opening 24. The bottom wall of the casing 40 is provided with a short conduit or outlet 68 which serves to discharge condensate or precipitated moisture by way of a squeegee 70 functioning as a one-way valve. The outlet of the blower casing is connected by means of an adapter conduit 72 (FIGURE 1) to an evaporator casing 74. Within the latter is mounted an evaporator core 76 and at the bottom of the casing 74 is a second squeegee outlet 78 for the discharge of condensate. The casing 74 is fixed to the fire wall 16 so that the core 76 supported by the casing is in registry with the large opening 26 of the fire wall.

Figure 2:
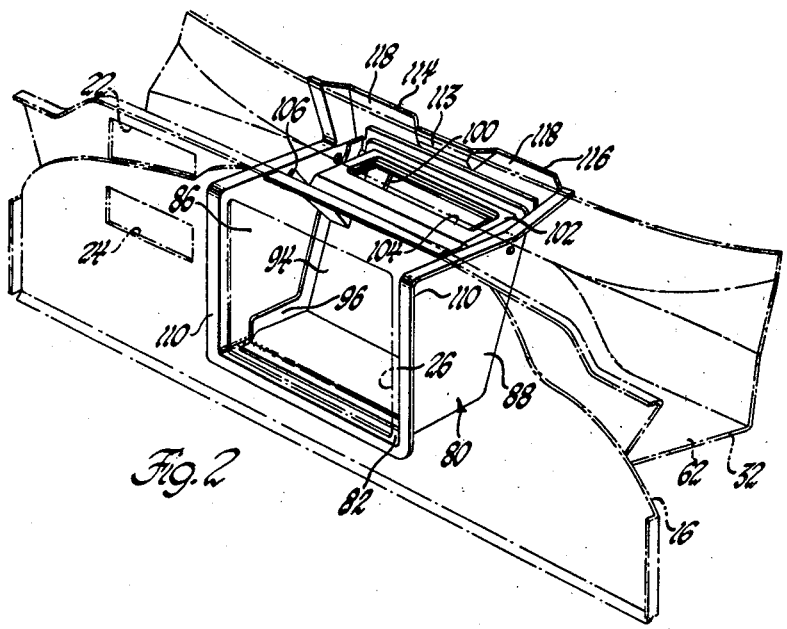
FIGURE 2 is a perspective view of a casing manifold and multiple partition sub-assembly as located with respect to a car body fire wall and cowl prior to complete car assembly.
Figure 3:
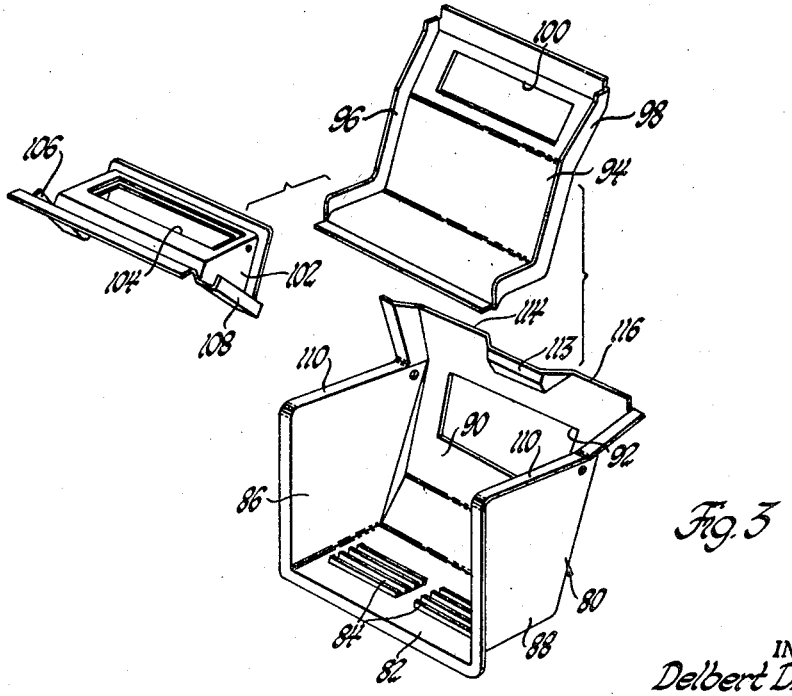
FIGURE 3 is an exploded perspective view of the casing manifold and partitions forming the sub-assembly of FIGURE 2 and with a knockout panel removed for air conditioning use.

Inside the passenger compartment 18 is provided a casing manifold sub-assembly best shown in FIGURES 2 and 3. This sub-assembly includes a casing or manifold 80 having a bottom wall 82 with louvers 84 therein. The two side walls 86 and 88 of this casing 80 are imperforate but a back wall 90 thereof is provided with a rectangular opening 92 (FIGURE 3) for use when the sub-assembly is to be placed on an automobile to be air conditioned.. If no air conditioning were to be supplied but only a heater then this opening 92 would not be made in the back wall of the casing 80. A knockout piece would be retained to close the opening if heating only is to be used. Inside the casing 80 is a generally L-shaped partition 94 having flanges 96 and 98 for attachment to the side walls 86 and 88 of the casing 80. The partition 94 bears a rectangular aperture 100 which is adapted to be used for either heating or air conditioning or ventilating. A second partition 102 with V-shaped sides is provided with a rectangular opening 104. This partition largely extends in a plane intersecting the general plane of the partition 94. Flanges 106 and 108 of the second partition 102 are fixed to the walls 86 and 88 of the casing 80. It will be appreciated that such a rigid sub-assembly fixed to the cowl panel 32 and the fire wall 16 by means of a flange 110 and a top flange 113 results in an extremely rigid body structure.

The upper rear margin of the casing 80 is so formed as to present two wall portions 114 and 116 separated by the flange 113. These portions are arranged to cooperate with the cowl panel 32 in formig two windshield defroster ducts 118.

Figure 6:
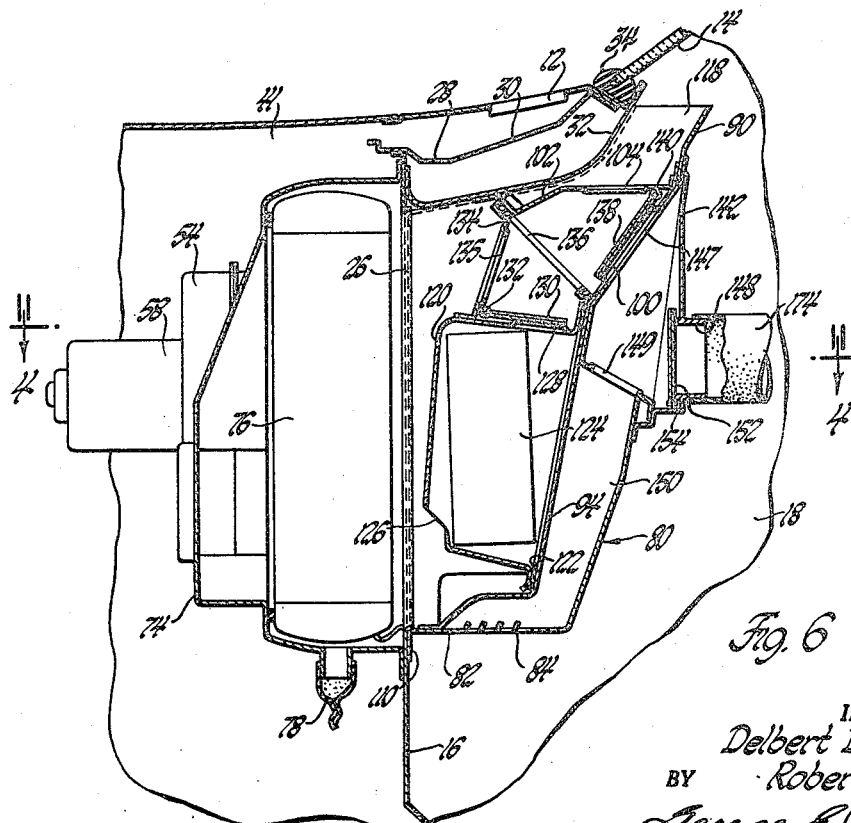
FIGURE 6 is a sectional view looking in the direction of the arrows 6—6 in FIGURE 4.

Upon installation of a heater core a third partition 120 is subsequently fixed within the casing 80 with a sealing gasket 122 interposed between it and a forward side of the partition 94. This partition 120 is boxlike in form and adapted to support and enclose a heater core 124. The partition 120 is also apertured at 126 at its forward low portion facing the fire wall opening 26 as seen in FIGURES 1 and 6. The top wall of the casing 120 bears a port 128 which is directed upwardly to be controlled by a damper 130 pivoted at 132. A fourth partition 134, containing a port 135, is located within the casing 80 and extends from the boxlike partition 120 to the partition 102 in an upper zone of the sub-assembly. A sealing gasket 136 is provided to make a tight fit between the partitions 134 and 102.

A second damper 138 is pivoted as at 140 to control the ports 104 and 100. To the rear of the L-shaped partition 94 and within the knockout opening 92 is located an adapter casing 142 which has three rearwardly directed openings 144, 146 and 148 (FIGURE 4) and two forwardly directed ports 147 and 149 (FIGURE 6), therein. The ports 147 and 149 respectively register with the port 100 and a space 150, the latter extending downwardly between the partition 94 and the back wall 90 of the casing 80. This space communicates with the louvers 84. The three openings 144, 146 and 148 are controlled by a damper 152 pivoted with a shaft at 154.

Figure 4:
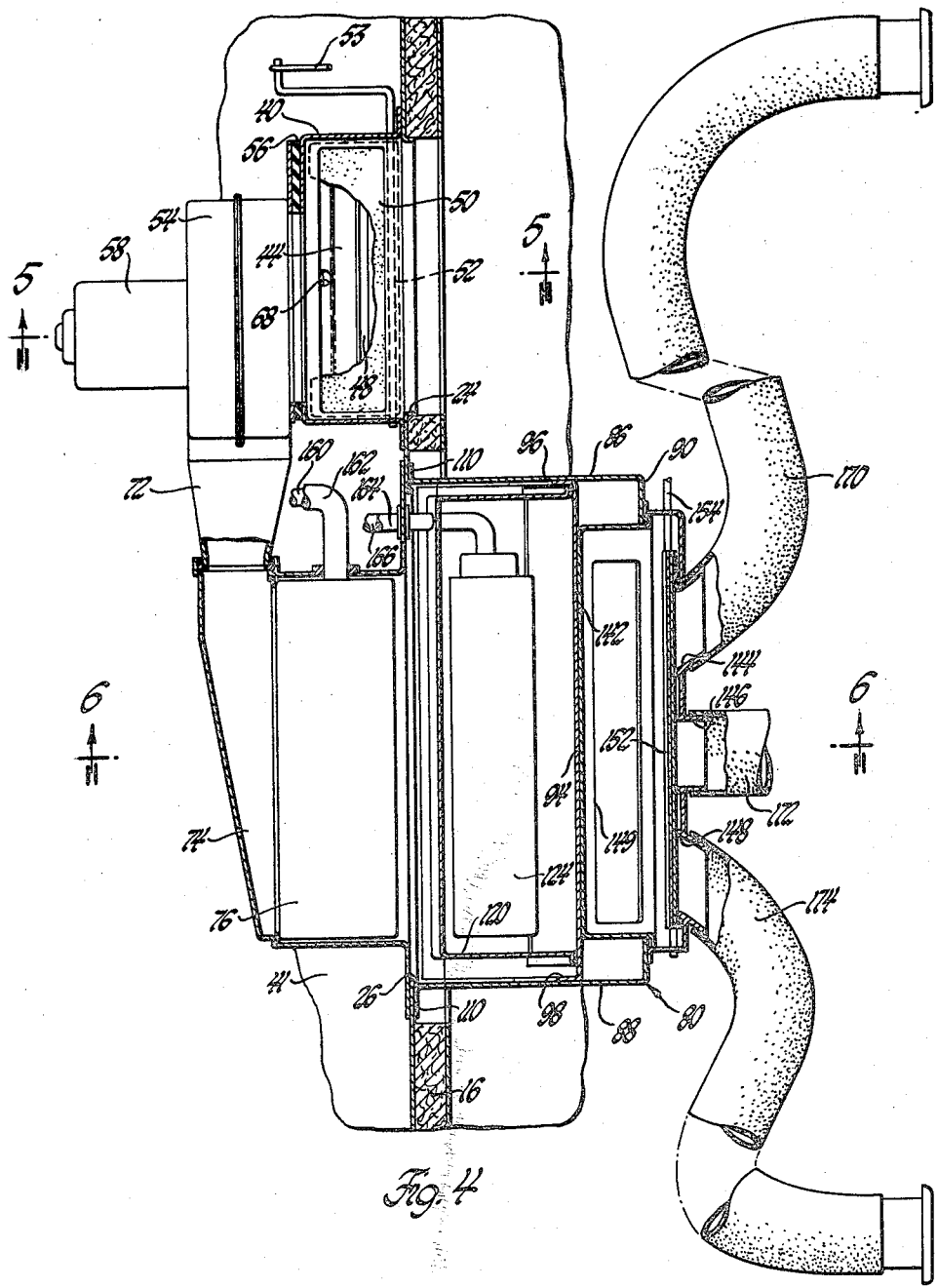
FIGURE 4 is an enlarged sectional view looking in the direction of the arrows 4—4 as seen in FIGURE 6.

As is conventional, cooled refrigerant may be circulated to and from the evaporator core 76 by means of conduits 160 and 162 as shown in FIGURE 4. As for the heater core 124, engine coolant may be conducted to and from it by way of conduits 164 and 166.

As the automobile depicted in the drawing is fitted with air conditioning and heating apparatus, it is essential that the opening 92 in the casing 80 be made so that communication may be had through the openings 144, 146 and 148 to the ducts 170, 172 and 174. These ducts may be led to portions of the instrument panel or elsewhere dependent upon the desired placement of the cooled air in the passenger compartment 18 and preferably to zones about midway the height of that compartment.

With the arrangement disclosed and assuming that the blower 54 is operating and the evaporator 76 is receiving refrigerant in accordance with demand, air is admitted at the outside openings 12 and flows into the chamber 62 of the cowl. This air then flows through the opening 22 of the fire wall into the chamber 60 and with the damper 46 properly placed, the air will flow downwardly through the port 46 and the blower 54 from which it is discharged by way of the casing 74 to the evaporator 76. This cooled air will then flow through the fire wall opening 26 into the sub-assembly 80. With the damper 130 closed with respect to the port 128, the cooled air will flow upwardly outside the partition 120 and through the port 135 in the partition 134 and then by way of the port 100 and the ducts 170, 172 and 174 to the passenger compartment, this being with the assumption that the damper 138 is in position closing the port 104 and that damper 152 is positioned to close the port 149. If desired, some of the air may be directed upwardly toward the windshield by having the damper 138 slightly removed or unseated from the port 104.

In the event that heat is required and humidity is not a problem, the refrigerant equipment will be shut down so that the evaporator 76 is no longer cold, the air from the blower will be directed through the port 126 and through the heater core 124 and then by way of the ports 128, 100, and 149 and the louvers 84 to the passenger compartment assuming that the dampers are properly positioned. If desired, the damper 138 may direct a portion or all of this air upwardly to the windshield 14.

If heating under humid conditions is necessary, it may be advantageous to reduce the humidity of the air flowing into the passenger compartment and this is advantageously performed by operating the evaporator 76 and thereby first cooling the air slightly to remove objectional moisture content. This dry air may then be heated by the core 124 and introduced into the passenger compartment.

If an accurate control of the passeinger compartment temperature is desired, whether an over-all heating or cooling effect is needed, the system herein described not only permits mixing of outside air with heated air but it also permits mixing of conditioned or refrigerated air with heated air in proportions to acquire the desired result. When air is cooled by the evaporator, its mixture with heated air affords a better temperature control as compared with the use of non-conditioned outside air with heated air.

The arrangement as depicted in the drawings shows the evaporator core 76 mounted forward of the fire wall 16. It is obvious that the arrangement is such that the location of the evaporator may be changed without losing the advantages of the structure installed to the rear of the fire wall. The evaporator core 76 could be mounted at one side of the cowl and suitably connected by duct work to the forward opening of the casing 80 without departing from the spirit of the present invention.

It will be appreciated that the air being handled may either come from the outside by way of the fire wall opening 22 or from the passenger compartment 18 by way of the lower fire wall opening 24 or from both depending upon the positioning of the damper 50.

Not only does the sub-assembly 80 lend rigidity to the body but when complete car assembly is engaged in, the heater core 124, the partitions 120 and 134, and the dampers 130 and 138 may conveniently be added because of the access opening 26 in the fire wall. If air conditioning is not desired, opening 92 may be left blocked off by the retained knockout piece, the adapter casing 142 with the ducts 170, 172 and 174 is omitted, and the casing 74 is made smaller because of the lack of the evaporator. From this it may be seen that all bodies may be the same at the termination of the body-building operation and, despite this fact, air-conditioning or heating components may subsequently be added to any one of the bodies with facility.

We claim:

1. An automotive heating and air conditioning system comprising an automotive body, said body defining a passenger compartment and having a cowl structure and a firewall forward of said passenger compartment, said firewall defining an aperture, said cowl structure extending rearwardly from said firewall, a subassembly joined to said firewall and cowl structure and extending into said compartment, heat exchange means in said subassembly and accessible for mounting and removal by way of said aperture, partitions within said subassembly and lying in planes intersecting at acute angles to effect rigidity in said body, said partitions defining through ports for air, said heat exchange means being mounted at the forward sides of said partitions, means for conducting outside air to said aperture, and dampers arranged to control said ports to direct air through and around said heat exchange means and into said passenger compartment.

2. An automotive heating and air conditioning system comprising an automobile body defining a passenger compartment and having a vertically extending firewall, said wall having an aperture, a cowl structure in substantial registry with said aperture and extending from one side of said firewall, means for introducing outside air to said aperture and from the other side of said firewall, said cowl structure having air discharge ports leading to said passenger compartment, a heater core in said cowl structure of such dimensions to to permit passage of said core through said aperture upon assembly of the system, partitions in and firmly fixed to said cowl structure and lying in planes slanted with respect to the firewall to lend rigidity to the said body, ports in said partitions giving communication between said heater core and said air discharge ports, and dampers controlling said partition ports whereby air flow from said aperture to said air discharge ports may be proportioned through and around said core and directed by said air discharge ports selectively.

3. A system as set forth in claim 2, said means for introducing outside air to said firewall aperture including a blower and an evaporator arranged in series for reducing the moisture content of said outside air upstream from said heater core.

References Cited in the file of this patent

UNITED STATES PATENTS

| | | |
|---|---|---|
| 2,735,657 | Owen | Feb. 21, 1956 |
| 2,789,794 | Moore et al. | Apr. 23, 1957 |
| 2,796,820 | Moore et al. | June 25, 1957 |
| 2,864,590 | Moore | Dec. 16, 1958 |